United States Patent
Bachmann et al.

[11] Patent Number: 6,141,952
[45] Date of Patent: Nov. 7, 2000

[54] METHOD OF OPERATING A COMBINED-CYCLE POWER PLANT

[75] Inventors: Rolf Bachmann, Döttingen; Fredy Häusermann, Gebenstorf; Peter Müller, Hüttikon; Gerhard Weiss, Oberrohrdorf, all of Switzerland

[73] Assignee: Asea Brown Boveri AG, Baden, Switzerland

[21] Appl. No.: 09/156,757

[22] Filed: Sep. 18, 1998

[30] Foreign Application Priority Data

Oct. 6, 1997 [EP] European Pat. Off. .............. 97810738

[51] Int. Cl.$^7$ ...................................................... F02C 6/18
[52] U.S. Cl. ......................................... 60/39.02; 60/39.182
[58] Field of Search ............................. 60/39.02, 39.091, 60/39.182

[56] References Cited

U.S. PATENT DOCUMENTS

| | | |
|---|---|---|
| 3,879,616 | 4/1975 | Baker et al. . |
| 4,519,207 | 5/1985 | Okabe et al. . |
| 5,099,643 | 3/1992 | Moore ................................. 60/39.182 |
| 5,301,499 | 4/1994 | Jensen et al. ........................ 60/39.182 |

FOREIGN PATENT DOCUMENTS

| | | |
|---|---|---|
| 0620362A1 | 10/1994 | European Pat. Off. . |
| 0674099A1 | 9/1995 | European Pat. Off. . |
| 0709561A1 | 5/1996 | European Pat. Off. . |
| 3-70805 | 3/1991 | Japan . |

*Primary Examiner*—Louis J. Casaregola
*Attorney, Agent, or Firm*—Burns, Doane, Swecker & Mathis, L.L.P.

[57] ABSTRACT

In a method of operating a combined-cycle plant, valves (21) acting upstream of a high-pressure steam turbine (12) are completely closed in the event of load shedding. The gas-turbine group (A+8) is uncoupled from an intermediate-pressure/low-pressure steam turbine (11) in such a way that the gas-turbine group can go into island mode. In this case, the speed of the uncoupled steam turbine (11) is not greater than the speed of the gas-turbine group (A+8), and steam (16) in the flow path of a reheater (10a) belonging to the heat-recovery steam generator (10) expands freely through the intermediate-pressure/low-pressure steam turbine (11), in the course of which this expansion does not cause the speed of the gas-turbine group (A+8) to exceed its protective speed.

3 Claims, 1 Drawing Sheet

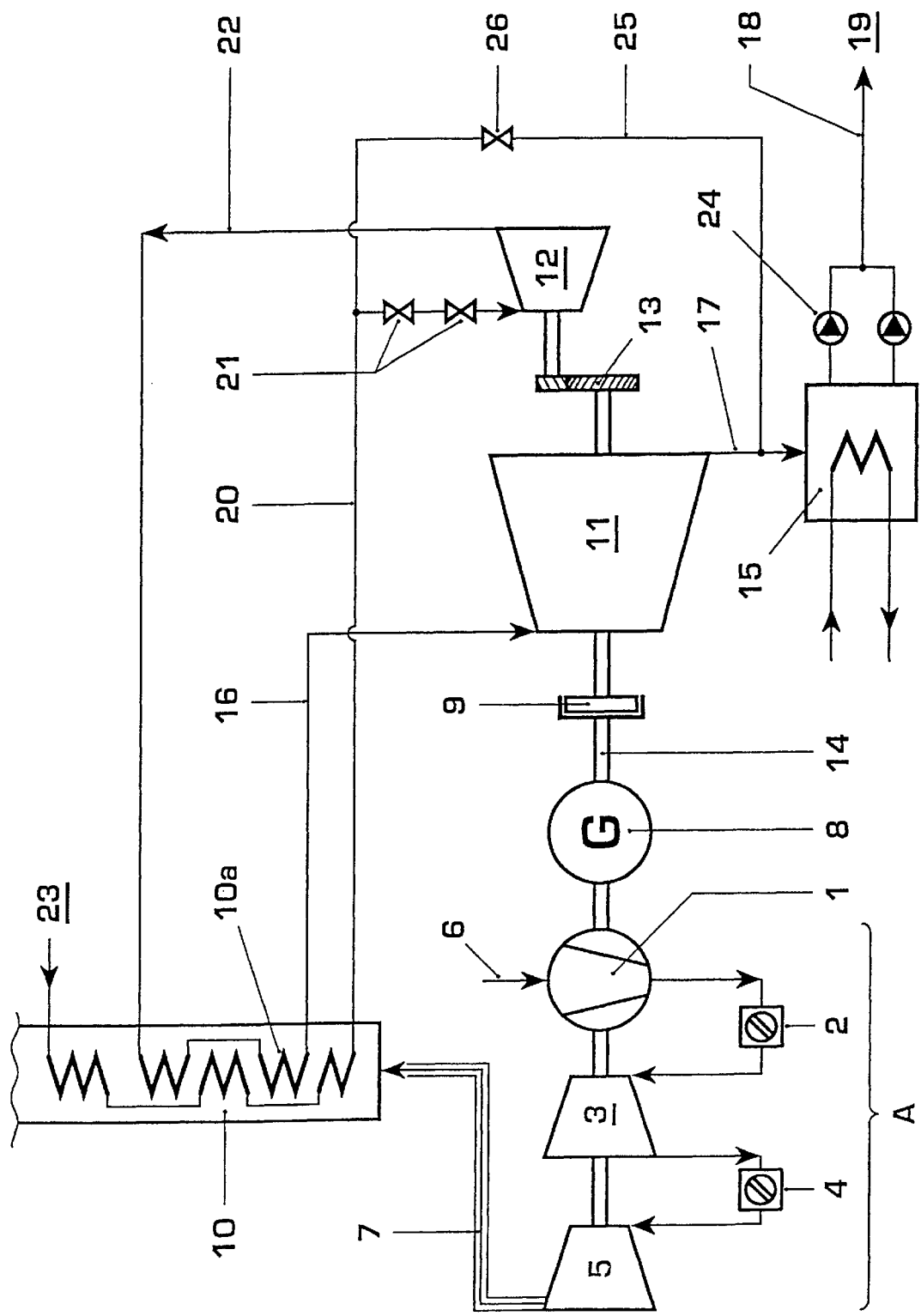
FIG.

METHOD OF OPERATING A COMBINED-CYCLE POWER PLANT

BACKGROUND OF THE INVENTION

1. Field of the Invention

The present invention relates to a method of operating a combined-cycle plant, essentially comprising a gas turbine, at least one generator and a steam circuit, this steam circuit essentially comprising a heat-recovery steam generator, at least one low-pressure and/or intermediate-pressure steam turbine and a high-pressure steam turbine.

2. Discussion of Background

EP-0 379 930 B1 has disclosed a combined-cycle plant which is characterized by a single-shaft arrangement. Here, the gas turbine and steam turbine are rigidly coupled to one another. The heat-recovery steam generator belonging to the steam circuit of this combined-cycle plant is operated as a dual-pressure boiler. The problem with such an arrangement is that the gas turbine must be prevented from going into overspeed in the event of load shedding and from then having to be shut down. On the contrary, it ought to go into isolated operation (=station-service operation) until it can be synchronized with the network again. However, this is difficult to carry out insofar as, on the one hand, the inflow of steam to the steam turbine has to be interrupted, otherwise the drive torque becomes too great and the plant consequently goes into overspeed, and, on the other hand, a minimum steam flow has to be maintained as cooling steam through the steam turbine in order to prevent the steam turbine firmly coupled to the gas turbine from heating up. Accordingly, provision is made here to maintain the cooling of the steam turbine with a quantity of steam prepared in an auxiliary unit, or to not completely close the valves of the steam turbine. Basically, however, the flow rate through the steam turbine is only reduced, so that the torque resulting therefrom, which leads to difficulties for the plant, has to be absorbed by other complicated control actions.

SUMMARY OF THE INVENTION

Accordingly, one object of the invention is to provide a novel method of operating a combined-cycle plant in such a way that circuit measures are to be taken and these circuit measures ensure that the fluid-flow machines are reliably protected in the event of load shedding of the plant.

According to the invention, a method of operating a combined-cycle plant, essentially comprising a gas turbine, at least one generator and a steam circuit, this steam circuit essentially comprising a heat-recovery steam generator, at least one low-pressure and/or intermediate-pressure steam turbine and a high-pressure steam turbine, is developed in such a way that, in the event of load shedding, at least one valve acting upstream of the high-pressure steam turbine is closed, that the gas turbine and the generator are uncoupled from the low-pressure and/or intermediate-pressure steam turbine in such a way that gas turbine and generator go into an isolated operation, that the speed of the uncoupled steam turbine is not greater than the speed of the gas turbine and generator, that steam in the flow path of a reheater belonging to the heat-recovery steam generator expands freely through the low-pressure and/or intermediate-pressure steam turbine, and that this expansion does not cause the speed of the gas turbine and of the generator to exceed their protective speed.

In the event of load shedding, first of all the valves upstream of the high-pressure steam turbine are completely closed; provided here at the same time are means which provide for the gas turbine to be uncoupled from the steam turbine. Since generator and gas turbine are integrated with one another on this side of an appropriately designed coupling, the two can run in isolated operation at an optimized speed without load interference from the steam turbine. During this action, the speed of the uncoupled steam turbine decreases; it remains below the 100% speed of the gas turbine and generator, which can be operated as an independent machine. The steam in the flow path of the reheater can then expand freely through the low-pressure and/or intermediate-pressure steam turbine, in which case the last-mentioned expansion also does not cause the speed of the gas turbine together with generator to exceed their protective speed.

The essential advantages of the invention are thus obvious, for, on the one hand, uncoupling can be effected between gas turbine and generator on the one side and the steam turbine on the other side. The steam in the flow path of the reheater, after the corresponding uncoupling, can expand freely to the corresponding steam turbine, whereby the latter need not be protected further by further auxiliary measures, for example by control measures. In addition, it is also not necessary here to provide a quantity of steam from an auxiliary unit for the cooling purposes of this steam turbine.

Advantageous and expedient further developments of the achievement of the object according to the invention are defined in the further claims.

BRIEF DESCRIPTION OF THE DRAWING

A more complete appreciation of the invention and many of the attendant advantages thereof will be readily obtained as the same becomes better understood by reference to the following detailed description when considered in connection with the accompanying drawing, wherein the single figure shows a circuit of a combined-cycle plant in which the gas turbine and the generator are uncoupled from the remaining fluid-flow machines in the event of load shedding, and the uncoupled steam turbine, here the intermediate-pressure/low-pressure steam turbine, need not be protected further.

DESCRIPTION OF THE PREFERRED EMBODIMENT

Referring now to the drawing, wherein all the features not required for the direct understanding of the invention have been omitted and the direction of flow of the media is indicated by arrows, the figure shows a combined-cycle plant, in which A depicts a sequentially fired gas turbine A, which essentially comprises a compressor unit 1, a first combustion chamber 2, a first turbine 3, a second combustion chamber 4 and a second turbine 5. For the more detailed mode of operation of such a gas turbine, reference is made to the description in EP-A1A0 620 362, this publication being an integral part of the present description. In principle, the gas turbine may also comprise a single firing system. The shaft line of the gas turbine A is in direct operative connection with a generator 8. Acting intermediately between generator 8 and a first steam turbine 11, here an intermediate-pressure/low-pressure steam turbine, is a coupling 9, which if need be enables the gas-turbine group, that is, the gas turbine A together with generator 8, to be uncoupled from the steam turbine 11. The exhaust gases 7 from the last turbine 5 of the gas-turbine group flow through a heat-recovery steam generator 10 which is in operative connection with a steam circuit. Such a steam circuit, in interaction with the residual thermal potential of the exhaust gases 7, is primarily intended to generate high-grade steam quantities which ensure the operation of at least one steam turbine. Publication EP-A1Ä0 674 099 shows typical steam circuits in connection with the operation of a gas/steam combined-cycle plant. This publication likewise forms an integral part of the present description.

The steam circuit shown here may be described in brief. As already mentioned, the exhaust gases 7 flow through the heat-recovery steam generator 10 (only partly shown here) and are then drawn off as flue gases. The heat-recovery steam generator 10 shown here represents an embodiment variant in which two qualitatively different steam quantities can be provided. Not apparent here is, for example, the operation of an economizer in use with the heat-recovery steam generator and having associated drums. For example, the hot water symbolized by arrow 23 flows from an economizer stage or steam drum into the heat-recovery steam generator 10, in which it is processed into superheated steam 20 via a plurality of heat-exchanging sections. This superheated steam 20 is then admitted to a high-pressure steam turbine 12, a number of valves 21 being provided upstream of the same. After the expansion in this turbine 12, the steam 22 flows back into the heat-recovery steam generator 10, in which it is again subjected to thermal processing via a separate flow path. This results in a superheated steam quantity 16, which is then admitted to the intermediate-pressure/low-pressure steam turbine 11. The two stages of the steam turbine 11, which are at different pressures, may also be separate from one another, or only one of the two stages may be available in turn. After this expansion, the expanded steam 17 is directed through a water- or air-cooled condenser 15. The condensate 18 from the latter is directed via a number of feed pumps 24 preferably into a feedwater tank (not shown here) and deaerator 19 and is returned from here back into the heat-recovery steam generator 10, the possible connection of evaporation cascades in interaction with one or more steam-generating lanes not being dealt with here in more detail. The high-pressure steam turbine 12 is connected via gearing 13 to the main rotor shaft 14, preferably to the intermediate-pressure/low-pressure steam turbine 11.

The mode of operation of the circuit is as follows: in the event of load shedding of the plant, the valves 21 acting upstream of the high-pressure steam turbine 12 are completely closed. After that, a coupling 9 arranged intermediately between generator 8 and turbine 11, here the intermediate-pressure/low-pressure steam turbine, comes into action in such a way that the gas-turbine group, that is, the gas turbine A and the generator 8, is uncoupled from the steam turbines 11, 12. During this uncoupling, the situation is such that a main shaft on the gas-turbine side is in interaction with the fluid-flow machines of the gas turbine A together with generator 8. It is therefore possible to run this gas-turbine group A+8 without thereby involving the uncoupled steam turbine 11. A speed which decreases and never becomes greater than the speed of the gas-turbine group running in isolated operation actually occurs within the steam-turbine group. The gas-turbine group A +8 also has a speed which, even due to the uncoupling, cannot exceed its protective speed. On the other hand, the steam in the flow path of a reheater 10a belonging to the heat-recovery-steam generator 10 can expand freely through the intermediate-pressure/low-pressure steam turbine 11, whereby further protective arrangements of this steam 11 turbine can be dispensed with. In this case, the reheater 10a or its steam lane is optimized in such a way that the stored volume does not lead to overspeed in the event of load shedding; protection of this steam turbine 11 by means of intercept valves is not necessary in principle in the case of such a design. The coupling 9 is preferably a self-synchronizing coupling, which automatically initiates the uncoupling action as soon as the speed of the steam turbine becomes greater than the speed of the gas-turbine group. A bypass line 25 having corresponding control elements 26 branches off from the steam line 20 carrying high pressure and leads directly into the condenser 15. The steam turbine 11 is therefore adequately protected such that, in the event of load shedding, at the start or during a normal shutdown, no quantity of steam has to be provided from an auxiliary unit for the cooling purposes of the steam turbine.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A method of operating a combined-cycle plant, essentially comprising a gas turbine, at least one generator and a steam circuit, this steam circuit essentially comprising a heat-recovery steam generator, at least one low-pressure and/or intermediate-pressure steam turbine and a high-pressure steam turbine, wherein, in the event of load shedding, at least one valve acting upstream of the high-pressure steam turbine is closed, wherein the gas turbine and the generator are uncoupled from the low-pressure and/or intermediate-pressure steam turbine in such a way that gas turbine and the generator go into isolated operation, wherein the speed of the uncoupled steam turbine is not greater than the speed of the gas turbine and the generator, wherein steam in the flow path of a reheater belonging to the heat-recovery steam generator expands freely through the low-pressure and/or intermediate-pressure steam turbine, and wherein this expansion does not cause the speed of the gas turbine and of the generator to exceed their protective speed.

2. The method as claimed in claim 1, wherein the high-pressure steam turbine and the low-pressure and/or intermediate-pressure steam turbine are bypassed by a steam-carrying line.

3. The method as claimed in claim 2, wherein the steam in the bypass line is directed into a condenser belonging to the steam circuit.

\* \* \* \* \*